(12) United States Patent
Miller

(10) Patent No.: US 11,585,060 B2
(45) Date of Patent: Feb. 21, 2023

(54) BOAT DOCKING SYSTEM

(71) Applicant: Joe Miller, Hendersonville, TN (US)

(72) Inventor: Joe Miller, Hendersonville, TN (US)

( * ) Notice: Subject to any disclaimer, the term of this patent is extended or adjusted under 35 U.S.C. 154(b) by 0 days.

(21) Appl. No.: 17/229,063

(22) Filed: Apr. 13, 2021

(65) Prior Publication Data

US 2022/0325491 A1 Oct. 13, 2022

(51) Int. Cl.
*E02B 3/26* (2006.01)
*B63B 59/02* (2006.01)
*B63B 59/00* (2006.01)

(52) U.S. Cl.
CPC ................ *E02B 3/26* (2013.01); *B63B 59/00* (2013.01); *B63B 59/02* (2013.01)

(58) Field of Classification Search
CPC ... E02B 3/26; E02B 3/28; B63B 59/02; B63B 2059/025
USPC .................. 405/211, 212–215; 114/219–220
See application file for complete search history.

(56) References Cited

U.S. PATENT DOCUMENTS

| | | | | |
|---|---|---|---|---|
| 3,145,685 A | * | 8/1964 | Kulick, Sr. | B63B 59/02 114/220 |
| 3,873,076 A | * | 3/1975 | Evans | B63B 59/02 267/140 |
| 4,005,672 A | * | 2/1977 | Files | B63B 59/02 405/215 |
| 6,332,421 B1 | * | 12/2001 | Leonard | B63B 59/02 114/220 |
| 6,406,221 B1 | * | 6/2002 | Collier | E02B 17/0017 405/213 |
| 2002/0050241 A1 | * | 5/2002 | Leonard | B63B 59/02 114/220 |
| 2008/0184924 A1 | * | 8/2008 | Atkinson | E02B 3/28 114/230.13 |

\* cited by examiner

*Primary Examiner* — Sunil Singh
(74) *Attorney, Agent, or Firm* — Mark A. Pitchford; Eric B. Fugett; Pitchford Fugett, PLLC

(57) ABSTRACT

A fender mounting assembly includes a backing plate and a branch. The backing plate is configured to attach to a slip wall to mount the fender mounting assembly to the slip wall. The branch is configured to hold a fender a predetermined distance away from the slip wall. The branch extends from the backing plate and includes a first section and a second section. The first section has a first end and a second end. The first end is attached to the backing plate. The second section has a third end and a fourth end. The third end is attached to the second end of the first section. When the fender mounting assembly is attached to the slip wall in an upright position via the backing plate, the second section of the branch extends downwardly from the first section of the branch.

11 Claims, 21 Drawing Sheets

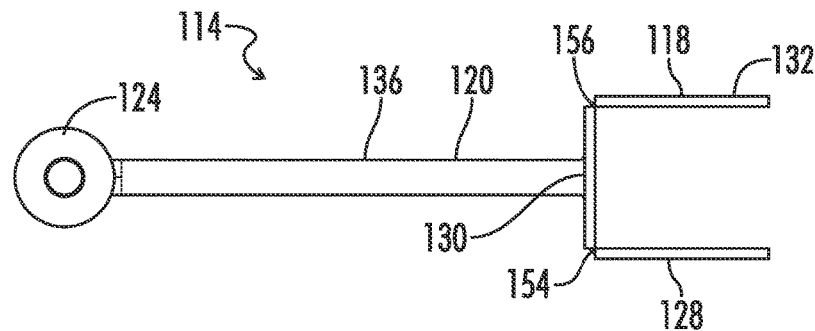
FIG. 15
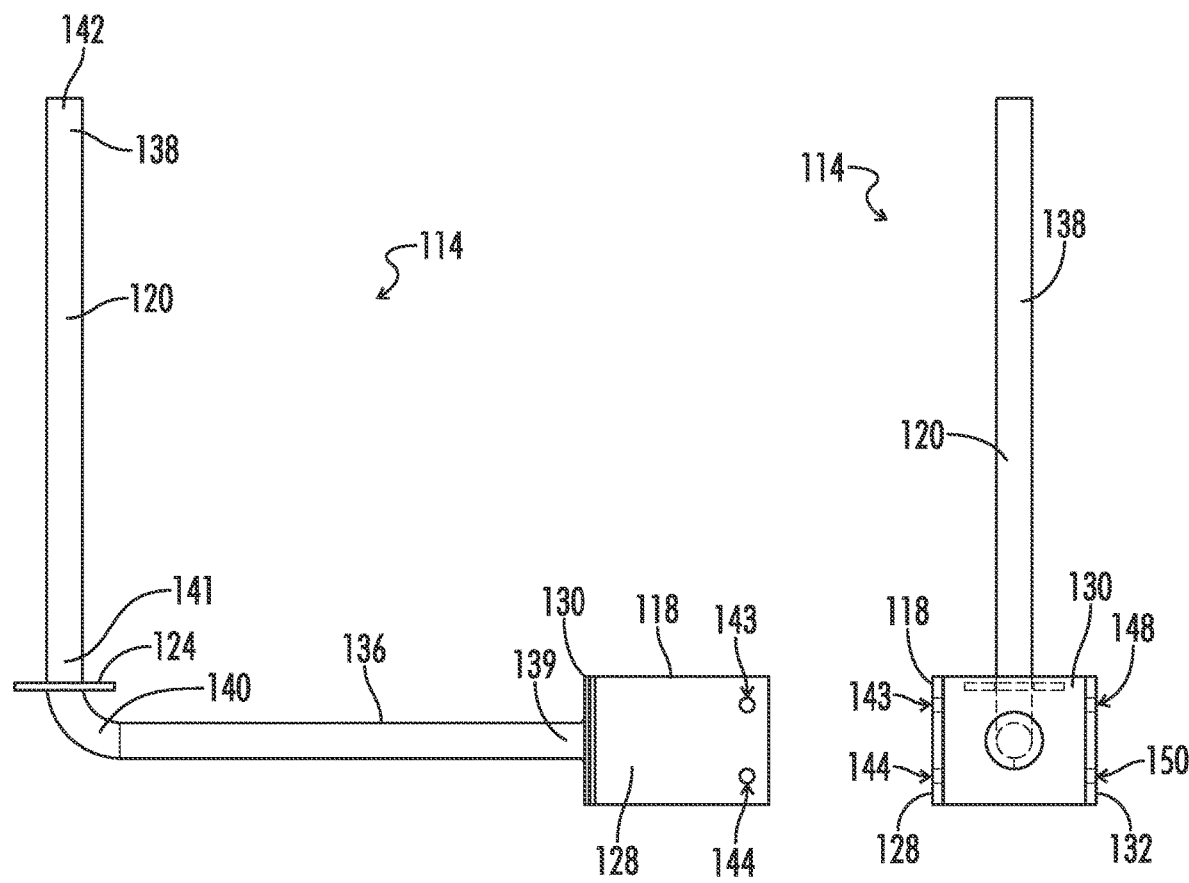
FIG. 17
FIG. 16

BOAT DOCKING SYSTEM

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to cushioning devices. Certain known cushioning devices include air-filled bolsters. These air-filled bolsters are disposed between objects to prevent the objects from contacting one another and/or to absorb impact forces generated by the objects acting on one another.

BRIEF SUMMARY OF THE INVENTION

In one aspect, a fender mounting assembly is configured to mount a fender to a slip wall. The fender mounting assembly includes a backing plate and a branch. The backing plate is configured to attach to a slip wall to mount the fender mounting assembly to the slip wall. The branch is configured to hold a fender a predetermined distance away from the slip wall. The branch extends from the backing plate and includes a first section and a second section. The first section has a first end and a second end. The first end is attached to the backing plate. The second section has a third end and a fourth end. The third end is attached to the second end of the first section. When the fender mounting assembly is attached to the slip wall in an upright position via the backing plate, the second section of the branch extends downwardly from the first section of the branch.

In another aspect, a fender mounting assembly is configured to mount a fender to a slip wall. The fender mounting assembly includes a top portion and a bottom portion. The top portion includes a backing plate and a branch. The backing plate is configured to attach to a slip wall to mount the fender mounting assembly to the slip wall. The branch is configured to hold a fender a predetermined distance away from the slip wall. The branch extends from the backing plate and includes a first section and a second section. The first section has a first end and a second end. The first end is attached to the backing plate. The second section has a third end and a fourth end. The third end is attached to the second end of the first section. When the fender mounting assembly is attached to the slip wall in an upright position via the backing plate, the second section of the branch extends downwardly from the first section of the branch. The bottom portion includes a backing plate and a branch. The backing plate is to attach to a slip wall to mount the fender mounting assembly to the slip wall. The branch is configured to hold a fender a predetermined distance away from the slip wall. The branch extends from the backing plate and includes a first section and a second section. The first section has a first end and a second end. The first end is attached to the backing plate. The second section has a third end and a fourth end. The third end is attached to the second end of the first section. When the fender mounting assembly is attached to the slip wall in an upright position via the backing plate, the second section of the branch extends upwardly from the first section of the branch.

In another aspect, a boat docking system is configured to mount to opposing slip walls of a slip for a boat. The system includes opposing first and second fender mounting assemblies. Each of the first and second fender mounting assemblies include a backing plate and a branch. The backing plate is configured to attach to one of the slip walls. The branch is configured to hold a first fender a predetermined distance away from the slip wall. The branch extends from the backing plate and includes a first section and a second section. The first section has a first end and a second end. The first end is attached to the backing plate. The second section has a third end and a fourth end. The third end is attached to the second end. When each of the first and second fender mounting assemblies are attached to one of the slip walls in an upright position via the backing plate, the second section extends downwardly from the first section. The system further includes opposing third and fourth fender mounting assemblies. Each of the third and fourth fender mounting assemblies includes a top portion and a bottom portion. The top portion includes a first bracket, a first top section, and a second top section. The first bracket is configured to mount to one of the slip walls. The first top section is connected to the first bracket and is configured to extend away from the slip wall. The second top section extends perpendicularly from the first top section and is configured to be inserted downwardly into a central bore in a second fender. The bottom portion includes a second bracket, a first bottom section, and a second bottom section. The second bracket is configured to mount to the slip wall. The first bottom section is connected to the second bracket and is configured to extend away from the slip wall. The second bottom section extends perpendicularly from the first bottom section and is configured to be inserted upwardly into the central bore in the second fender.

BRIEF DESCRIPTION OF THE SEVERAL VIEWS OF THE DRAWINGS

FIG. 15 is a top view of the bottom portion of FIG. 14.

FIG. 16 is a side view of the bottom portion of FIGS. 14 and 15.

FIG. 17 is another side view of the bottom portion of FIGS. 14-16.

Reference will now be made in detail to optional embodiments of the invention, examples of which are illustrated in accompanying drawings. Whenever possible, the same reference numbers are used in the drawing and in the description referring to the same or like parts.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

As described herein, an upright position is considered to be the position of apparatus components while in proper operation or in a natural resting position as described herein. Vertical, horizontal, above, below, side, top, bottom and other orientation terms are described with respect to this upright position during operation unless otherwise specified. The term "when" is used to specify orientation for relative positions of components, not as a temporal limitation of the claims or apparatus described and claimed herein unless otherwise specified. The terms "above", "below", "over", and "under" mean "having an elevation or vertical height greater or lesser than" and are not intended to imply that one object or component is directly over or under another object or component.

The phrase "in one embodiment," as used herein does not necessarily refer to the same embodiment, although it may. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without operator input or prompting, whether these features, elements and/or states are included or are to be performed in any particular embodiment.

The terms "coupled" and "connected" mean at least either a direct connection between the connected items or an indirect connection through one or more intermediary components.

Figure 1:
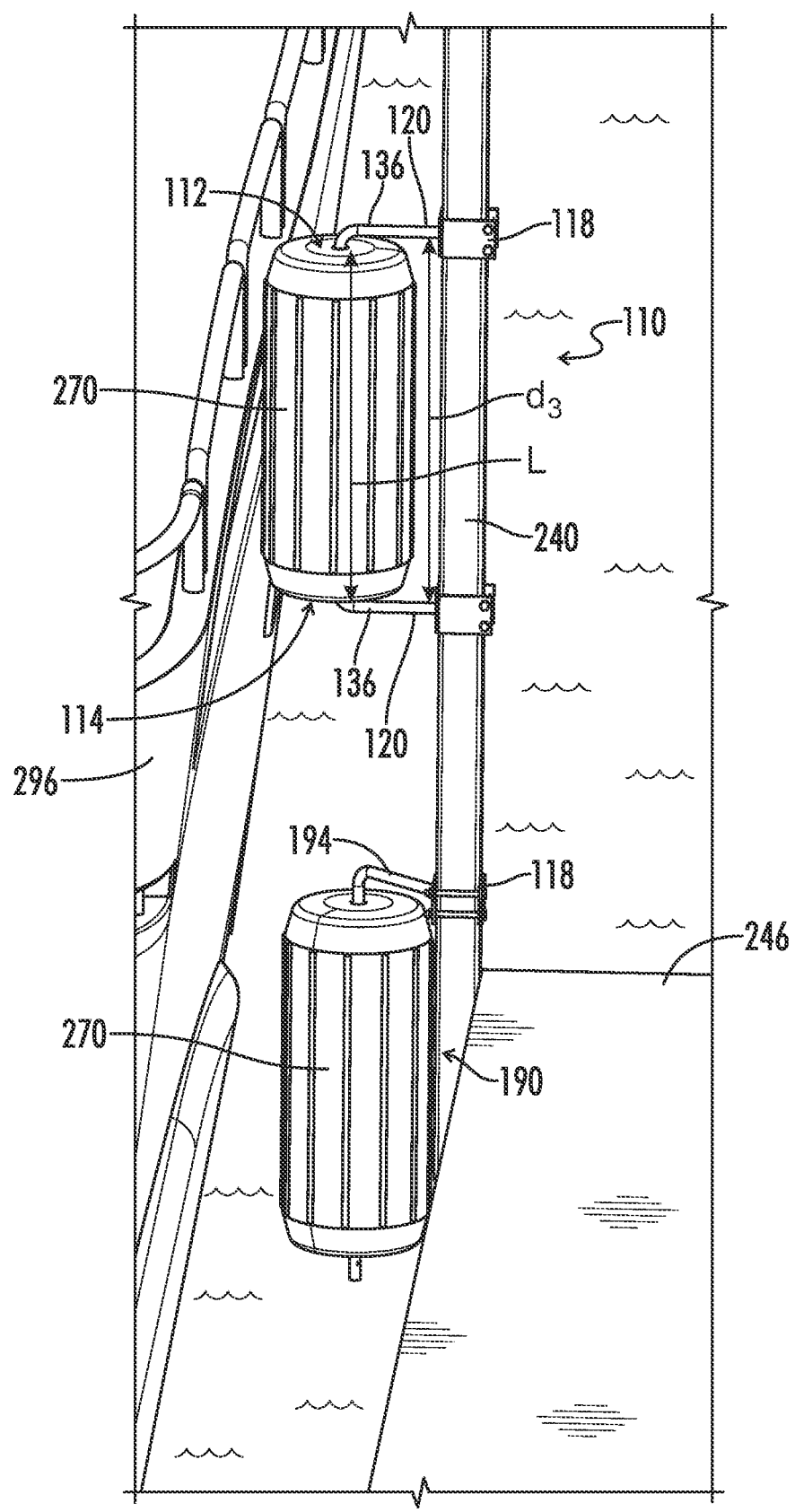
FIG. 1 is a perspective view of a first example fender mounting assembly engaged with a fender and with a first example post and a second example fender mounting assembly engaged with another fender and with the first example post to distance a boat from a first dock.
Figure 5:
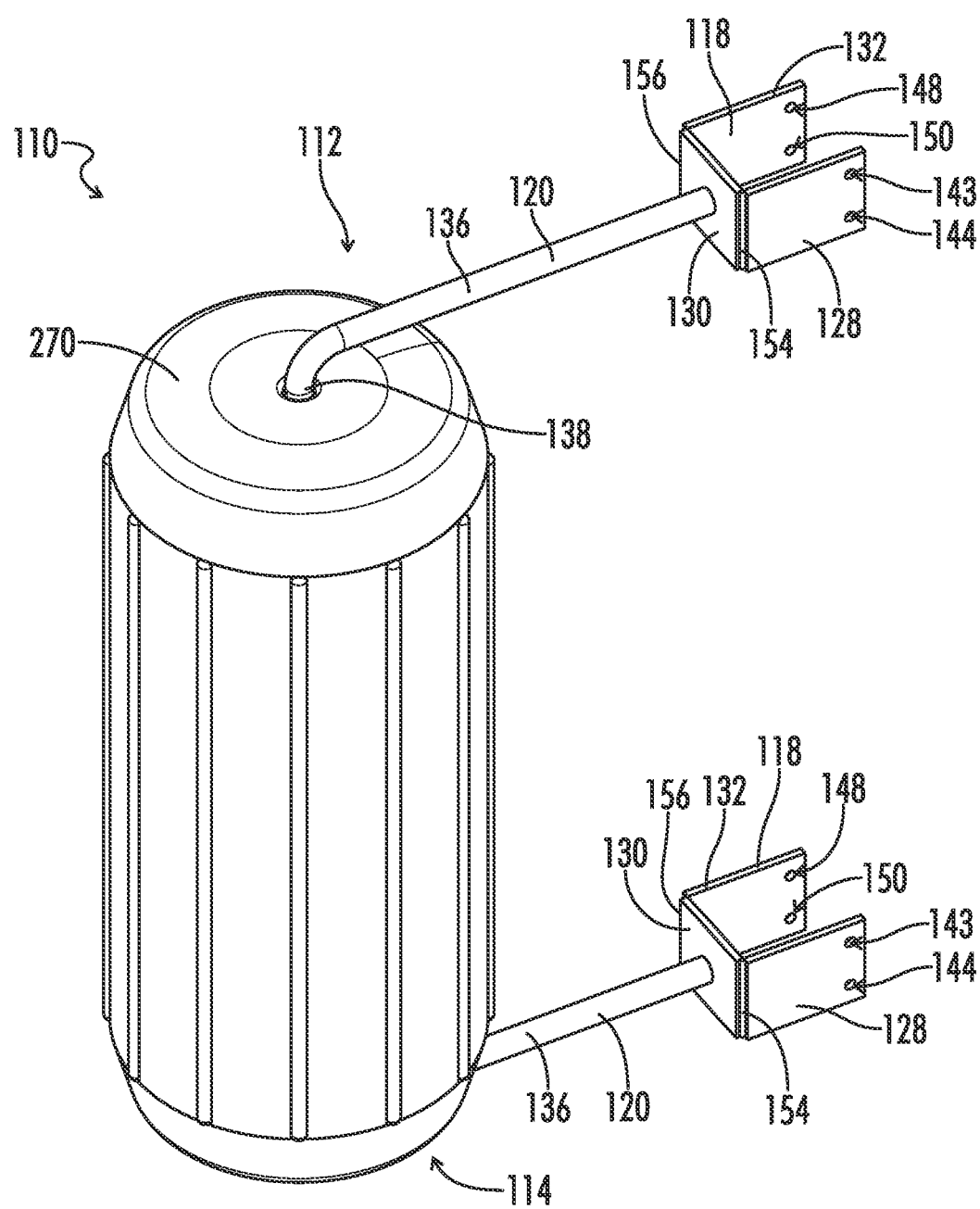
FIG. 5 is an isometric view of the first example fender mounting assembly of FIGS. 1, 2, and 4 engaged with the fender of FIGS. 1-4.
Figure 6:
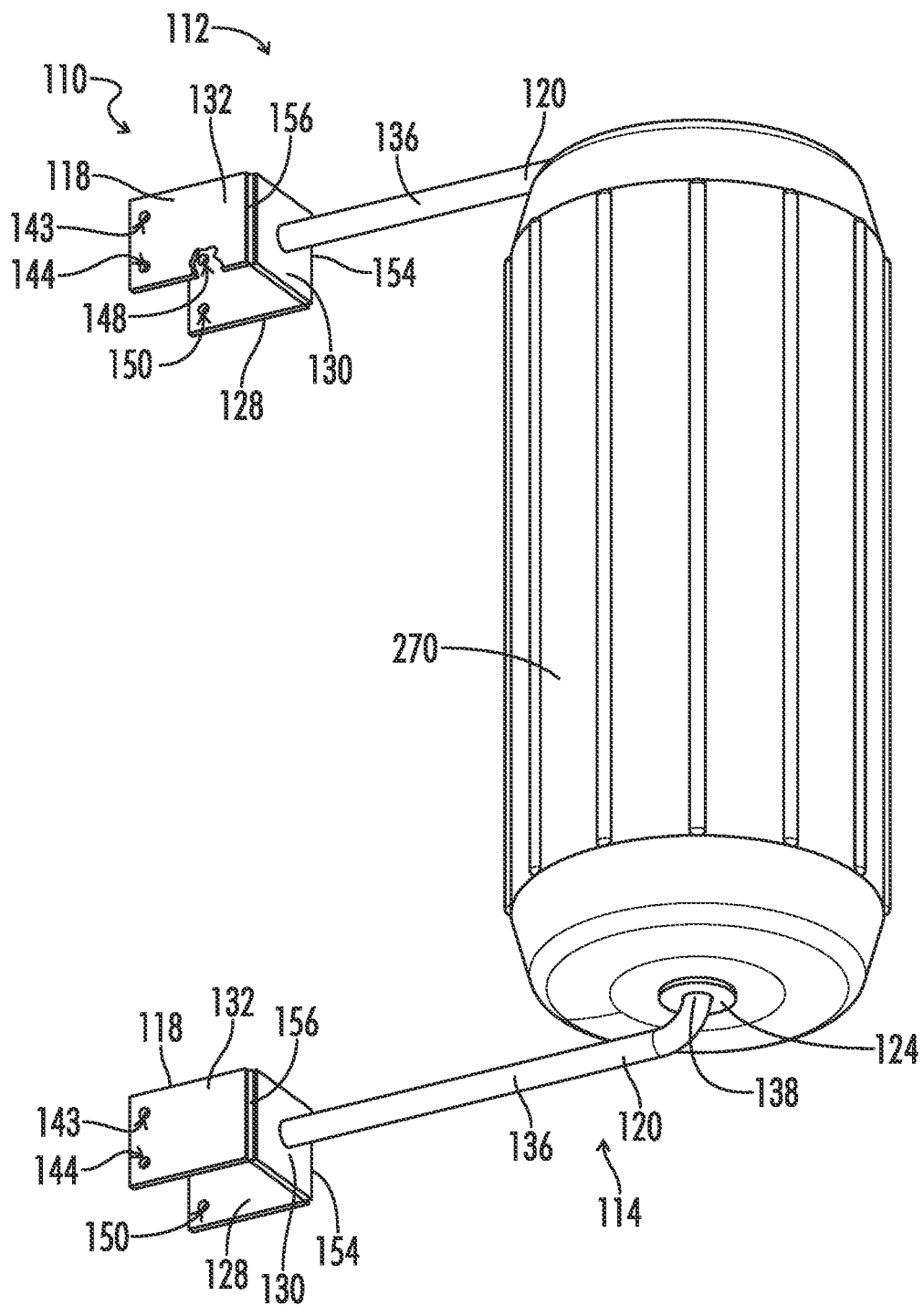
FIG. 6 is a second isometric view of the first example fender mounting assembly of FIGS. 1, 2, 4, and 5 engaged with the fender of FIGS. 1-5.
Figure 13:
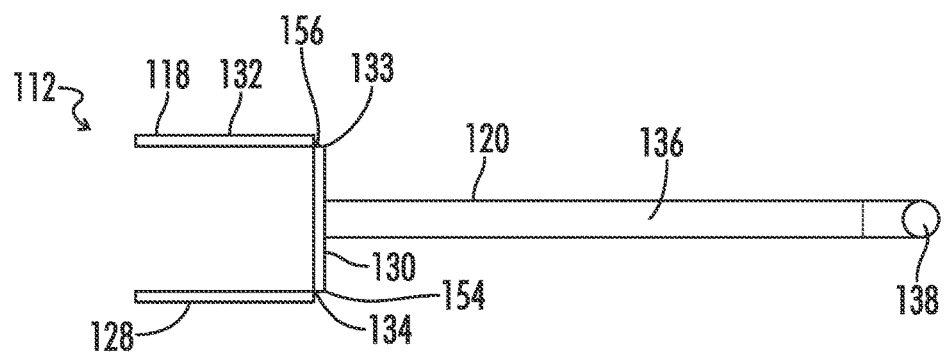
FIG. 13 is a bottom view of the top portion of FIGS. 10-12.
Figure 14:
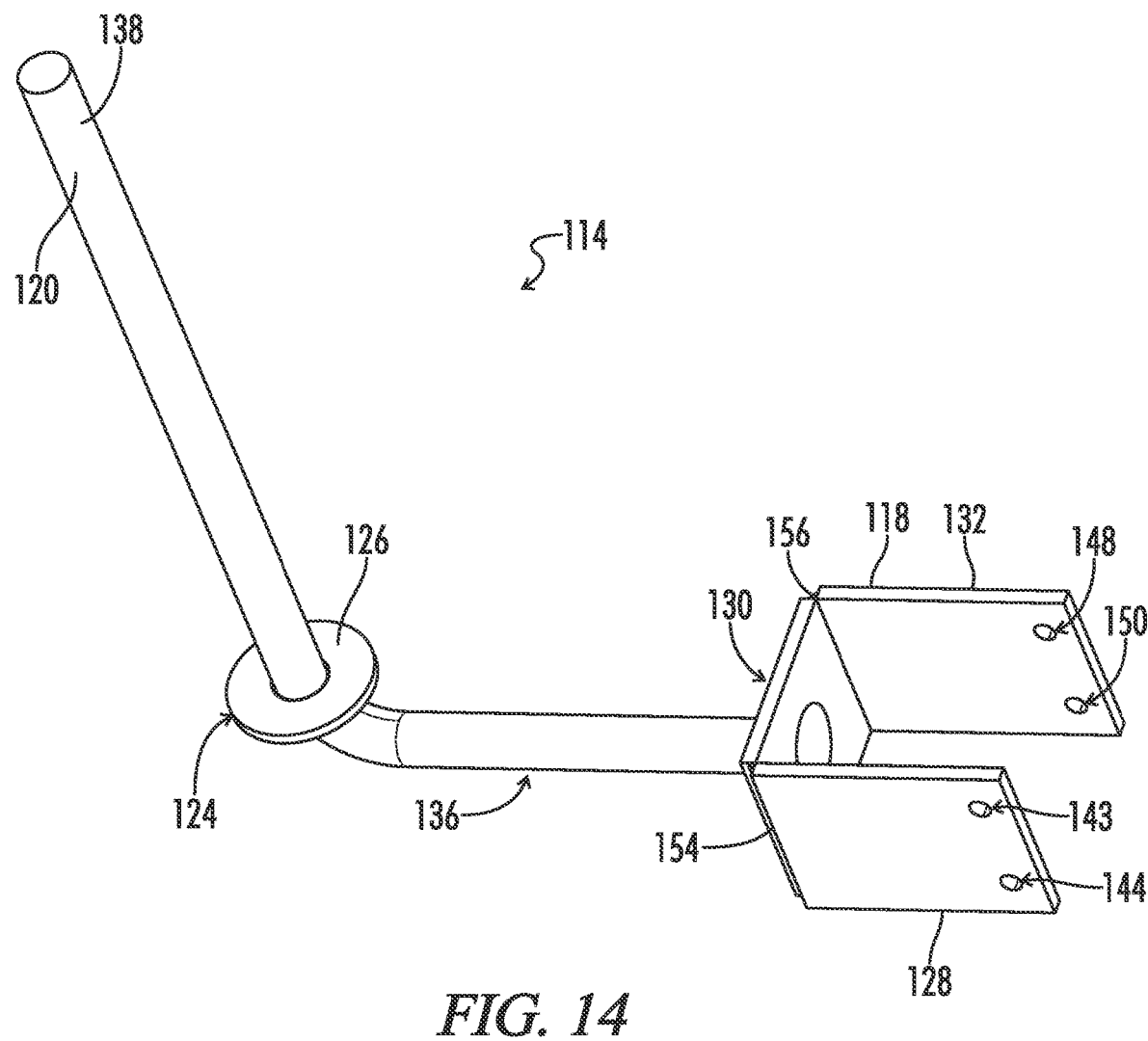
FIG. 14 is an isometric view of a bottom portion of the first example fender mounting assembly of FIGS. 1, 2 and 4-6.

With reference to FIGS. 1, 5, and 6, a first example fender mounting assembly 110 includes a top portion 112 and a bottom portion 114. The top portion 112 and the bottom portion 114 each include a bracket 118 and a branch 120. Looking specifically at FIG. 6, the bottom portion 114 also includes a retainer 124. The bracket 118 includes a first clamping ear 128, a backing plate 130, and a second clamping ear 132. With reference to FIG. 13, the backing plate 130 has a first edge 133 and a second edge 134. The first clamping ear 128 is connected to the backing plate 130 at the first edge 133. The second clamping ear 132 is connected to the backing plate 130 at the second edge 134. Returning to FIG. 6, the branch 120 is connected to and extends from the bracket 118. The retainer 124 is connected to the branch 120. With reference to FIG. 14, the retainer 124 has a relatively smooth top surface 126.

Figure 11:
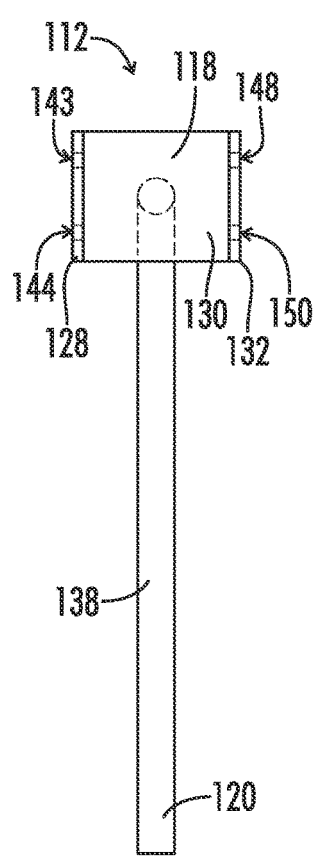
FIG. 11 is side view of the top portion of FIG. 10.
Figure 12:
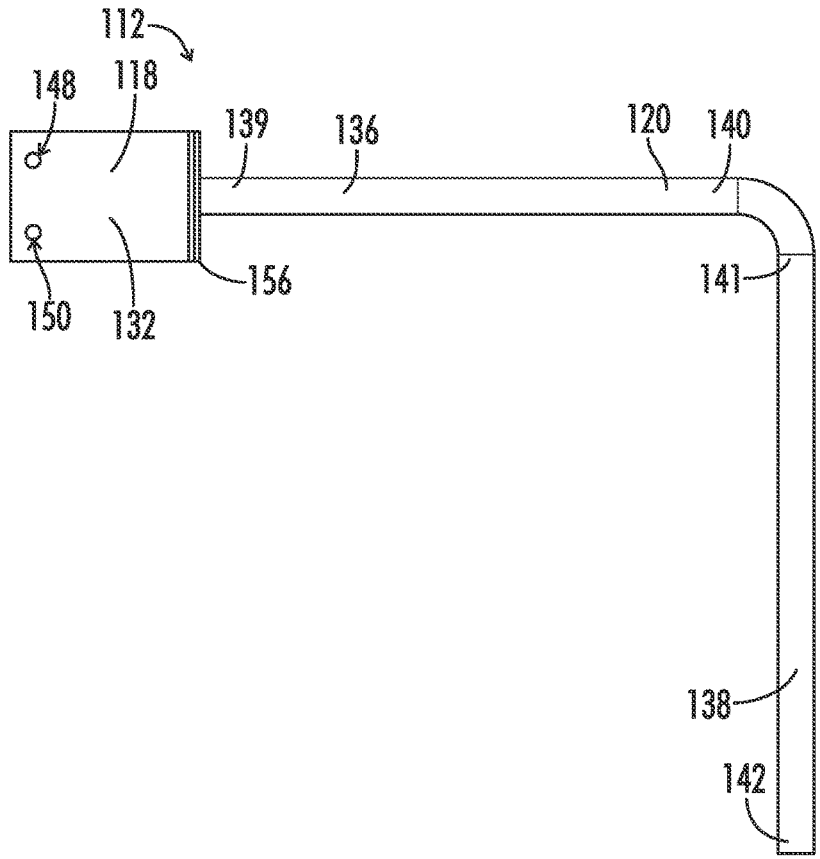
FIG. 12 is another side view of the top portion of FIGS. 10 and 11.

With reference to FIGS. 10-14 and 17, the branch 120 includes a first section 136 and a second section 138. With reference to FIGS. 12 and 17, the first section has a first end 139 and a second end 140. The second section 138 has a third end 141 and a fourth end 142. The first end 139 of the first section 136 is connected to the bracket 118. More specifically, with reference to FIGS. 13 and 15, the first section 136 is connected to and extends generally perpendicularly from the backing plate 130. Turning to FIG. 12, third end 141 is connected to the second end 140 such that the second section 138 is connected to and extends generally perpendicularly from the first section 136. Thus, the branch 120 is "L" shaped. With reference to FIG. 17, the retainer 124 is connected to and extends radially outwardly from the second section 138.

With reference to FIGS. 11 and 16, the first clamping ear defines a first opening 143 and a second opening 144. The second clamping ear 132 defines a third opening 148 and a fourth opening 150. The first opening 143 is aligned with the third opening 148. The second opening 144 is aligned with the fourth opening 150.

With reference to FIG. 13, the first clamping ear 128 is connected to the backing plate 130 to define a first corner 154. The backing plate 130 is connected to the second clamping ear 132 to define second corner 156. Thus, the bracket 118 is generally "C" shaped.

Figure 18:
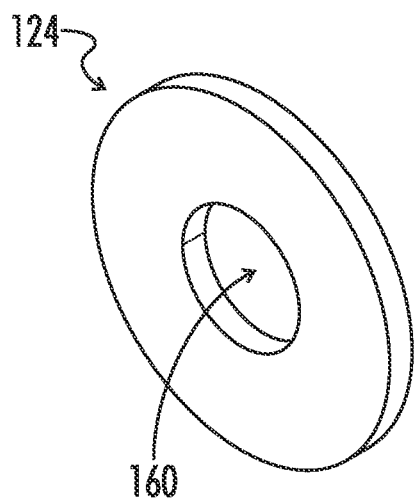
FIG. 18 is an isometric view of a retainer of the bottom portion of FIGS. 14-17.
Figure 19:
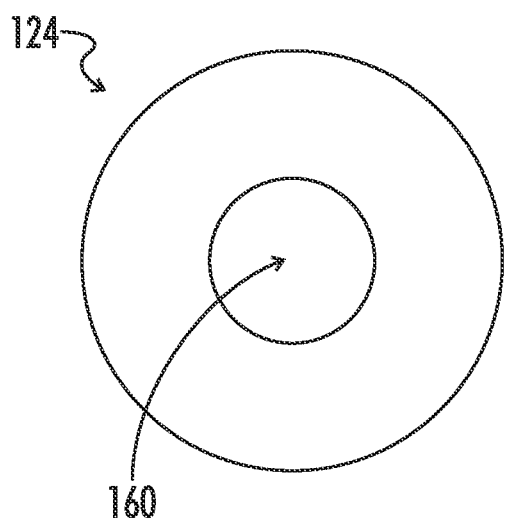
FIG. 19 is a top view of the retainer of FIG. 18.
Figure 20:
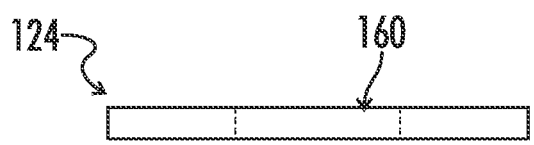
FIG. 20 is a side view of the retainer of FIGS. 18 and 19.

With reference to FIGS. 18-20, the retainer 124 defines an opening 160. In the illustrated examples of FIGS. 18-20 the retainer 124 is depicted as a washer. In one embodiment, the retainer 124 is a cotter pin through the opening 160, and a washer is included with the retainer 124 to prevent the pin from chafing the fender retained by the retainer 124. It should be understood that the retainer 124 may have any outer perimeter shape (e.g., ellipsoid, ovate, polygonal, etc.). With reference to FIG. 17, the second section 138 extends through the opening 160.

With reference to FIG. 6, it is anticipated that the top portion 112 and the bottom portion 114 are to be constructed from one or more durable, resilient materials (e.g., polymer, steel, rubber, etc.). Thus, with reference to FIGS. 10 and 14, the first section 136 is resiliently flexible relative to the bracket 118. Further, the second section 138 is resiliently flexible relative to the first section 136.

Figure 21:
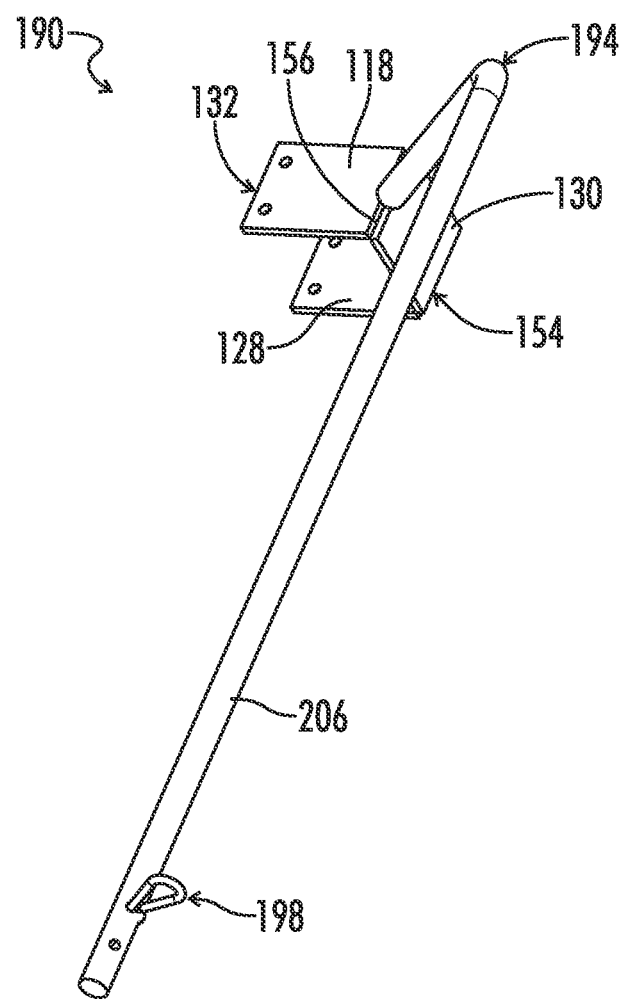
FIG. 21 is an isometric view of the second example fender mounting assembly of FIGS. 1, 3, 4, 7, and 8.
Figure 22:
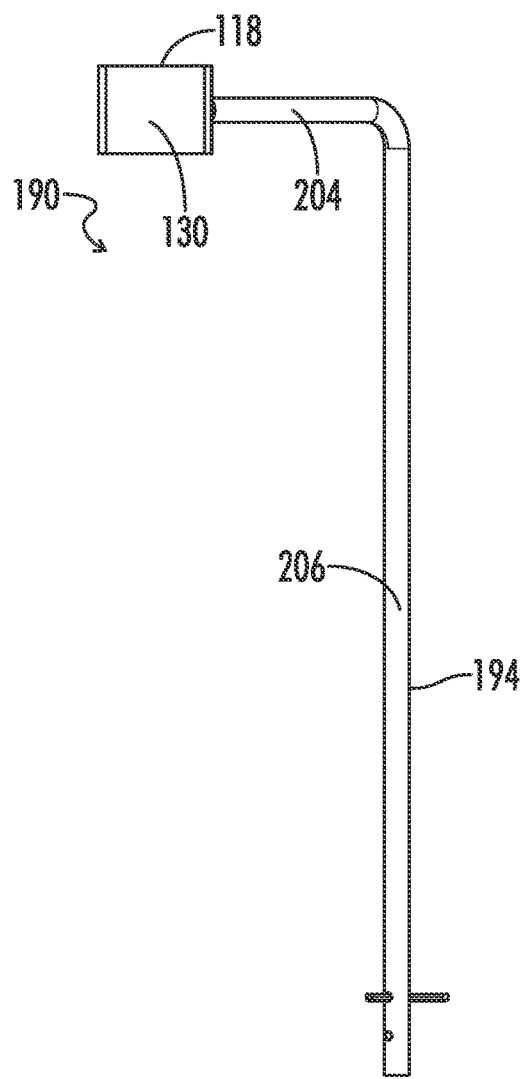
FIG. 22 is a side view of the second example fender mounting assembly of FIGS. 1, 3, 4, 7, 8, and 21.
Figure 23:
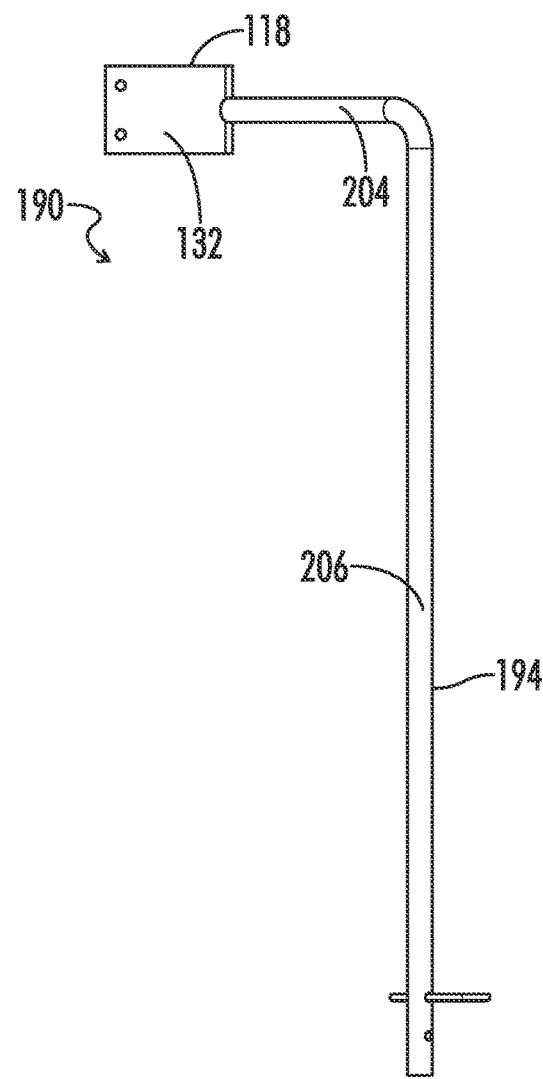
FIG. 23 is another side view of the second example fender mounting assembly of FIGS. 1, 3, 4, 7, 8, 21, and 22.
Figure 24:
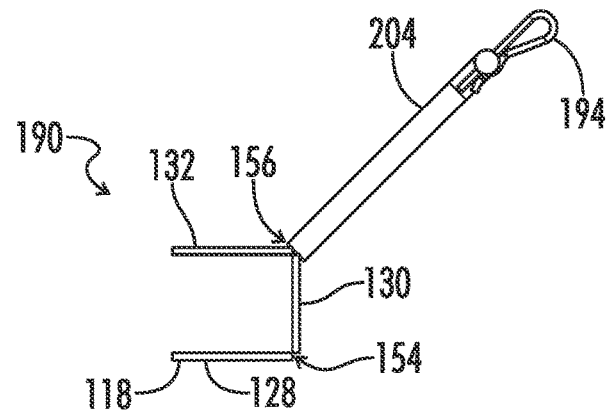
FIG. 24 is a bottom view of the of the second example fender mounting assembly of FIGS. 1, 3, 4, 7, 8, and 21-23.

With reference to FIG. 21, a second example fender mounting assembly 190 includes a branch 194, a retainer 198, and the bracket 118. Looking at FIGS. 22 and 23, the branch 194 is connected to and extends from the bracket 118. The branch 194 includes a first section 204 and a second section 206. The second section 206 is longer than the first section 204. With reference to FIG. 24, more specifically, the first section 204 is connected to and extends non-perpendicularly from the backing plate 130. Thus, the first section 204 is non-perpendicular relative to the second clamping ear 132. In some embodiments, first section 204 of the branch 194 extends at angle between 15 and 85 degrees with respect to the backing plate 130. In another embodiment, the branch 194 extends from a portion of the assembly 190 other than the backing plate 130 such as one of the clamping ears.

With reference to FIG. 21, the second section 206 is connected to and extends generally perpendicularly from the first section 204. Thus, the branch 194 is generally "L" shaped. The second section 206 defines one or more openings 212. The retainer 198 selectively and removably extends through one of the openings 212. In the illustrated examples of FIGS. 21-24, the retainer 198 is depicted as a cotter pin. It should be understood that the retainer 198 may be any type of removable retaining device (e.g., a peg with a detent, a pin, a cotter pin, a snap ring, etc.).

Figure 28:
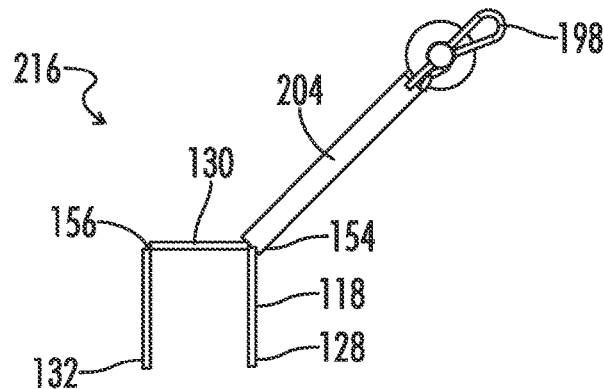
FIG. 28 is a bottom view of the of the third example fender mounting assembly of FIGS. 4, and 25-27.

With reference to FIG. 25-28 a third example fender mounting assembly 216 includes the branch 194, the retainer 198, and the bracket 118. The third example fender mounting assembly 216 is a mirror image of the second example fender mounting assembly 190. Turning to FIG. 28, more specifically, the first section 204 is connected to and extends from the first corner 154.

With reference to FIGS. 29-32, a fourth example fender mounting assembly 220 includes the branch 194, the retainer 198, and the bracket 118. Looking at FIG. 32, more specifically, the first section 204 is connected to and extends generally perpendicularly from the backing plate 130.

Figure 25:
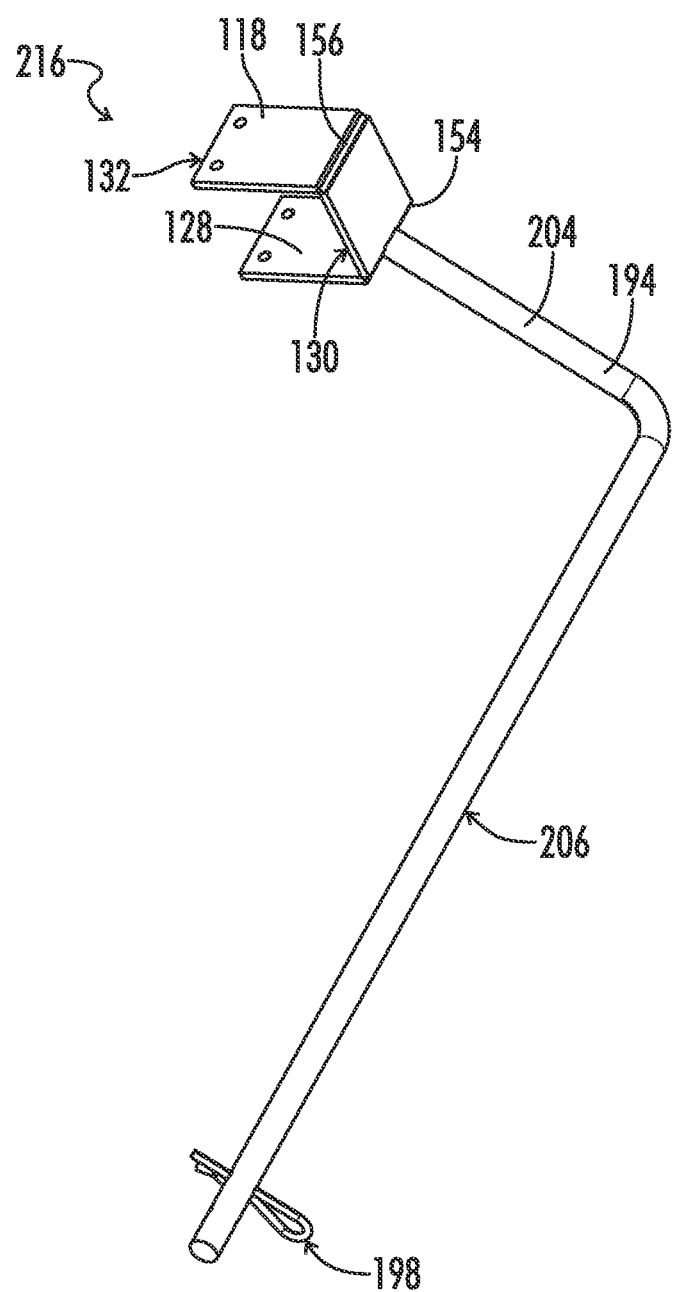
FIG. 25 is an isometric view of the third example fender mounting assembly of FIG. 4.
Figure 26:
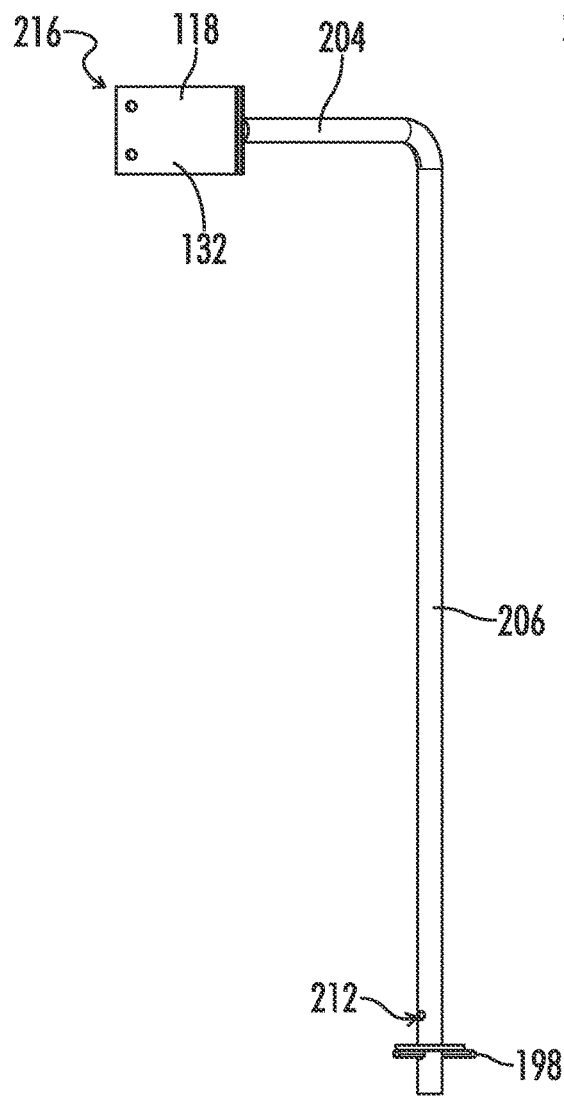
FIG. 26 is a side view of the third example fender mounting assembly of FIGS. 4 and 25.
Figure 27:
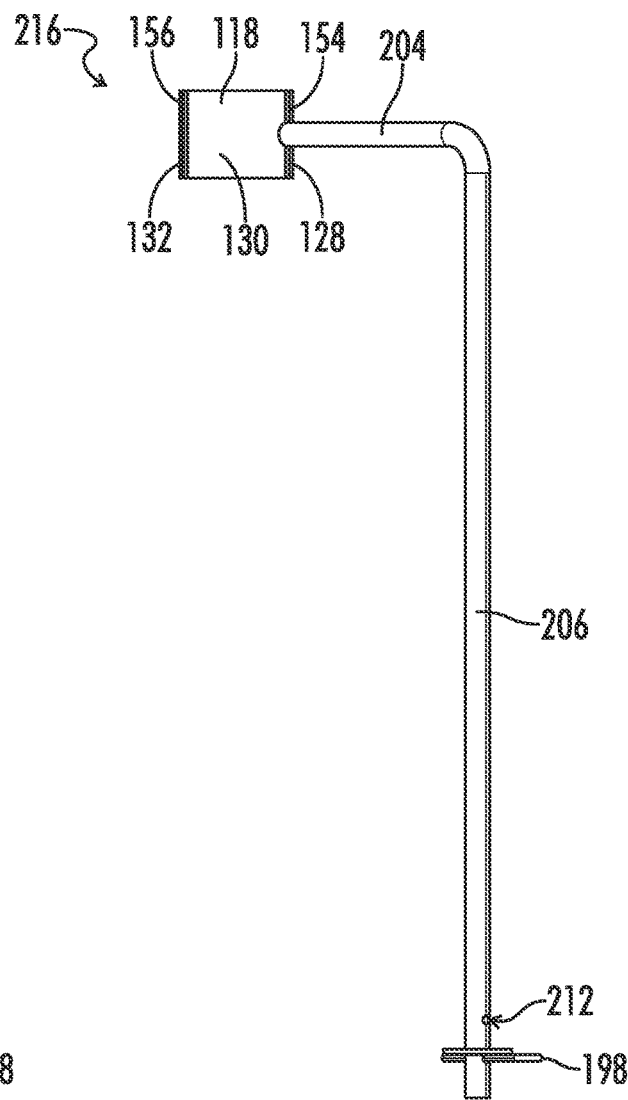
FIG. 27 is another side view of the third example fender mounting assembly of FIGS. 4, 25, and 26.
Figure 29:
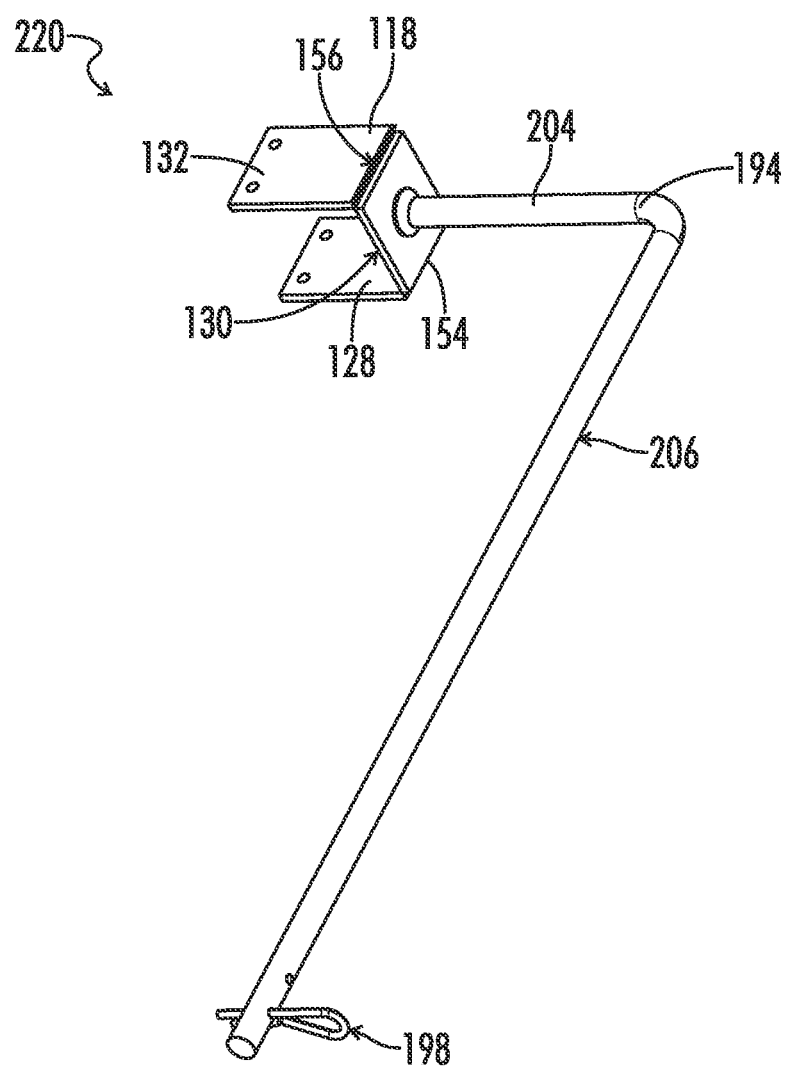
FIG. 29 is an isometric view of a fourth example fender mounting assembly.
Figure 30:
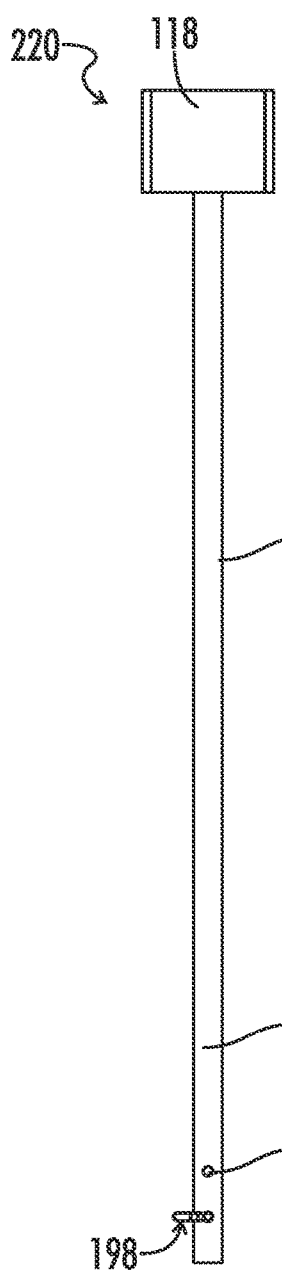
FIG. 30 is a side view of the fourth example fender mounting assembly of FIG. 29.
Figure 31:
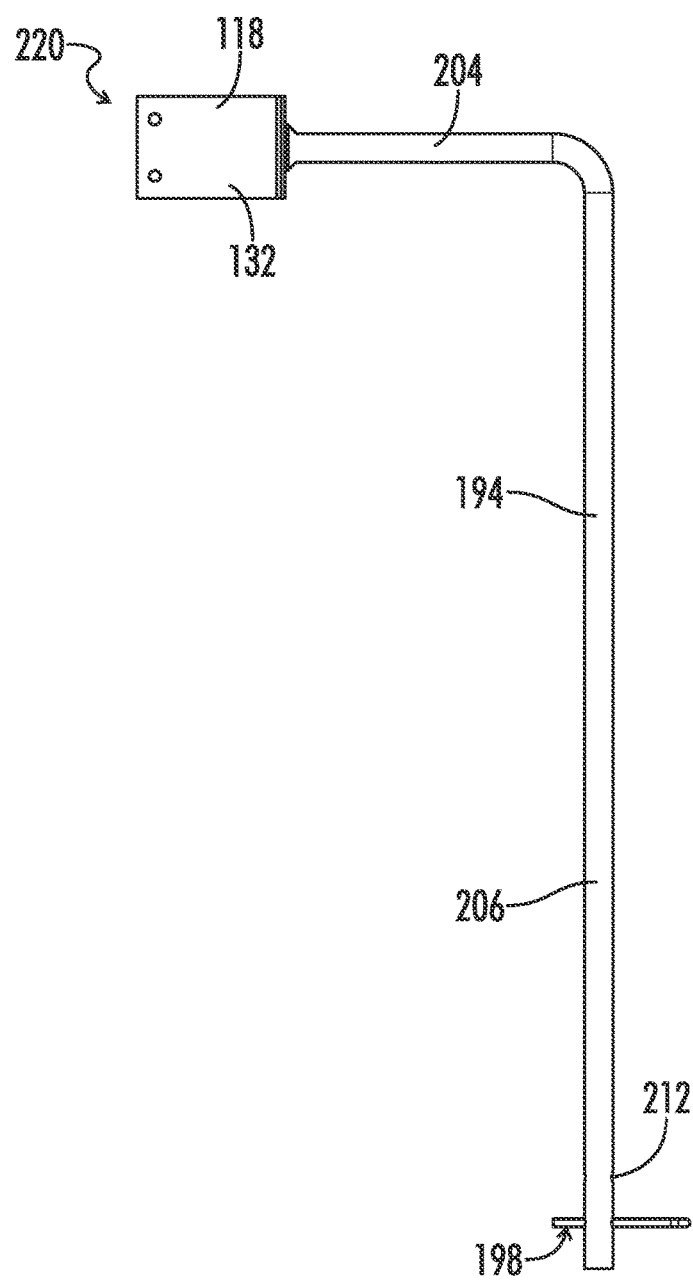
FIG. 31 is another side view of the fourth example fender mounting assembly of FIGS. 29 and 30.
Figure 32:
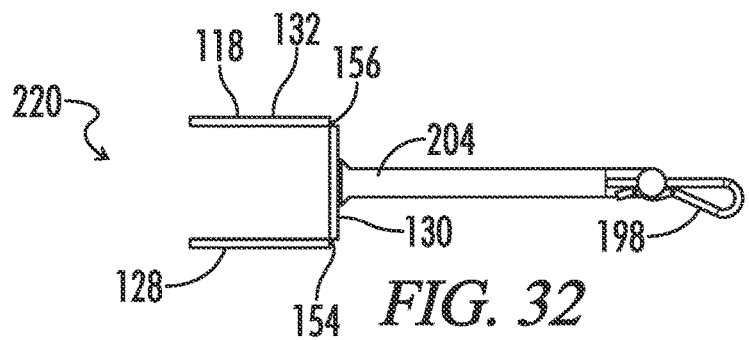
FIG. 32 is a bottom view of the of the fourth example fender mounting assembly of FIGS. 29-31.

With reference to FIGS. 21, 25, and 29, it is anticipated that the second example fender mounting assembly 190, the third example fender mounting assembly 216, and the fourth example fender mounting assembly 220 are to be constructed from one or more durable, resilient materials (e.g., polymer, steel, rubber, etc.). Thus, with reference to FIGS. 21, 25, and 29, the first section 204 is resiliently flexible relative to the bracket 118. Further, the second section 206 is resiliently flexible relative to the first section 204.

Figure 3:
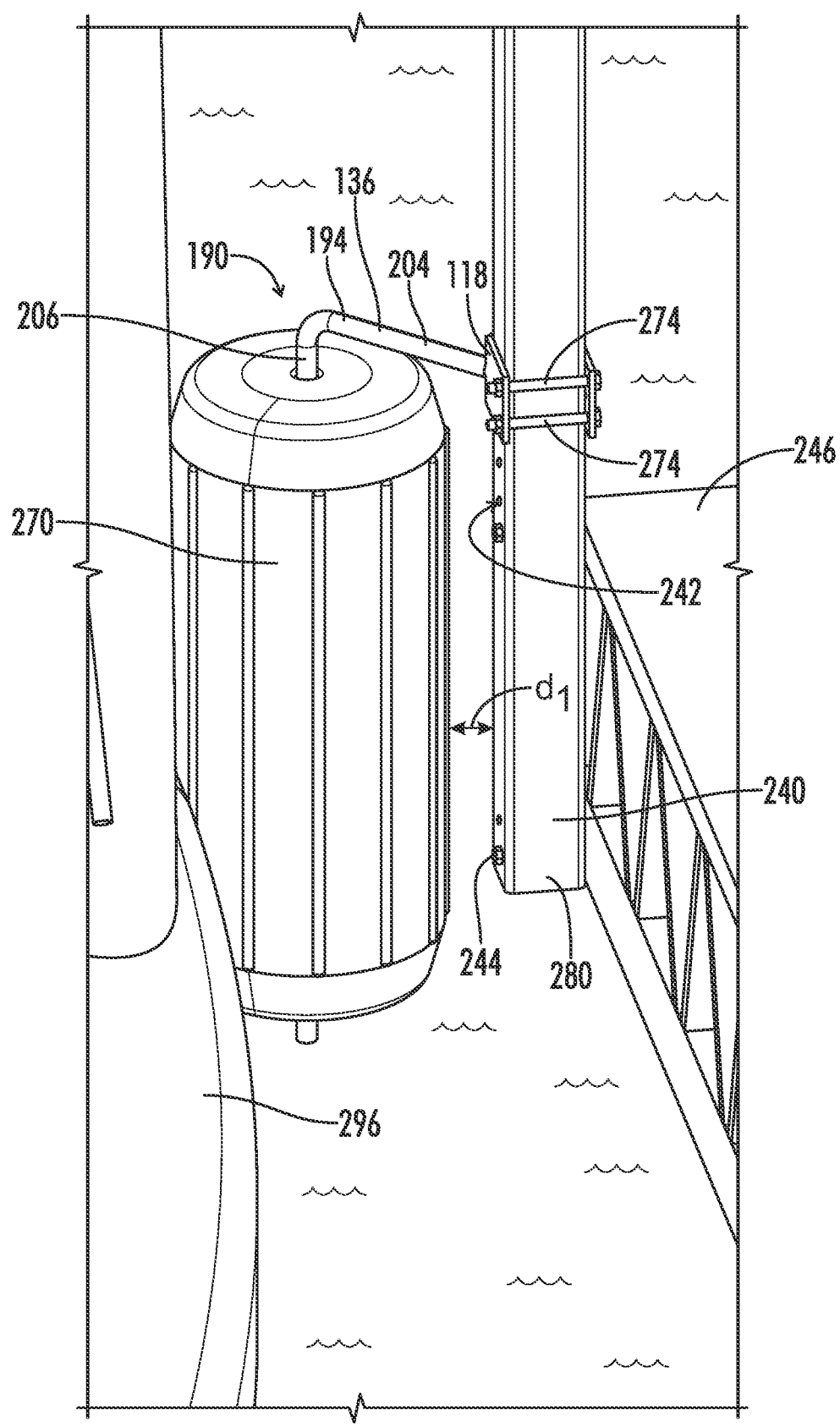
FIG. 3 is an enlarged perspective view of the second example fender mounting assembly engaged with the fender of FIG. 1 and with the first example post of FIGS. 1 and 2.

With reference to FIG. 3, an example post 240 defines a plurality of openings 242. In operation, a plurality of fasteners 244 extend through the openings 242 to mount the first example post 240 vertically to a first slip wall 246.

Figure 9:
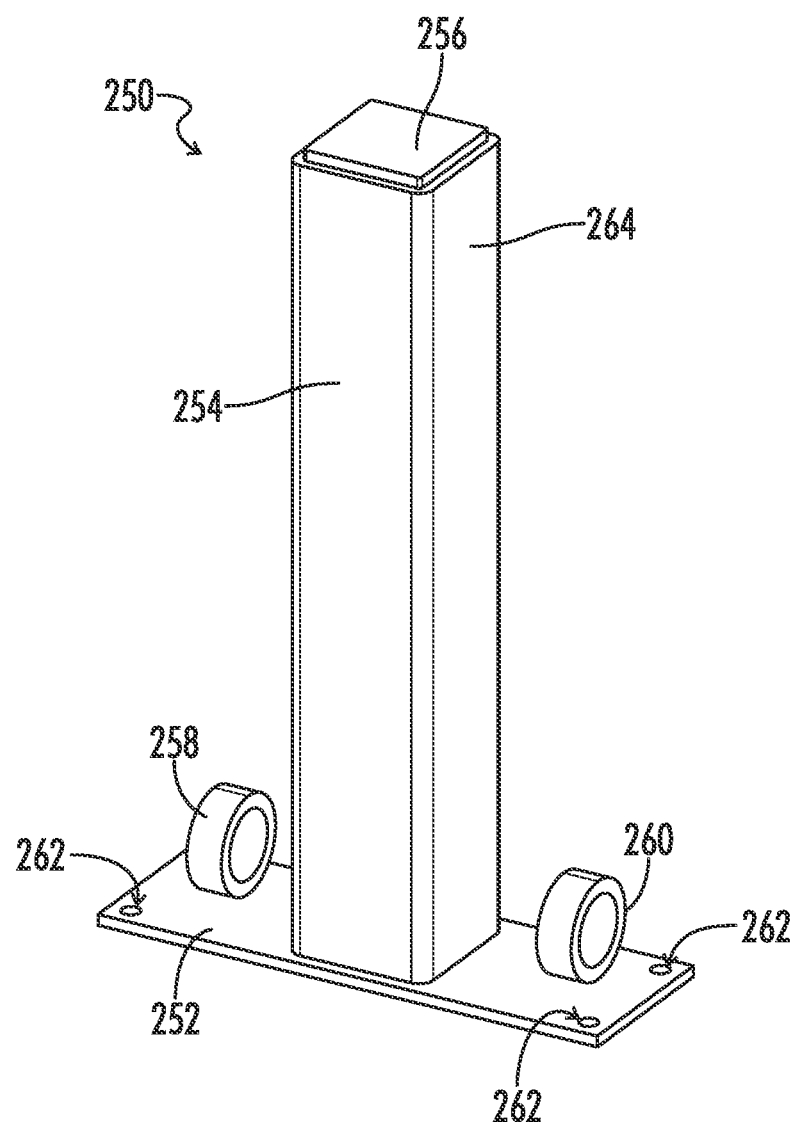
FIG. 9 is an isometric view of a second example post.
Figure 10:
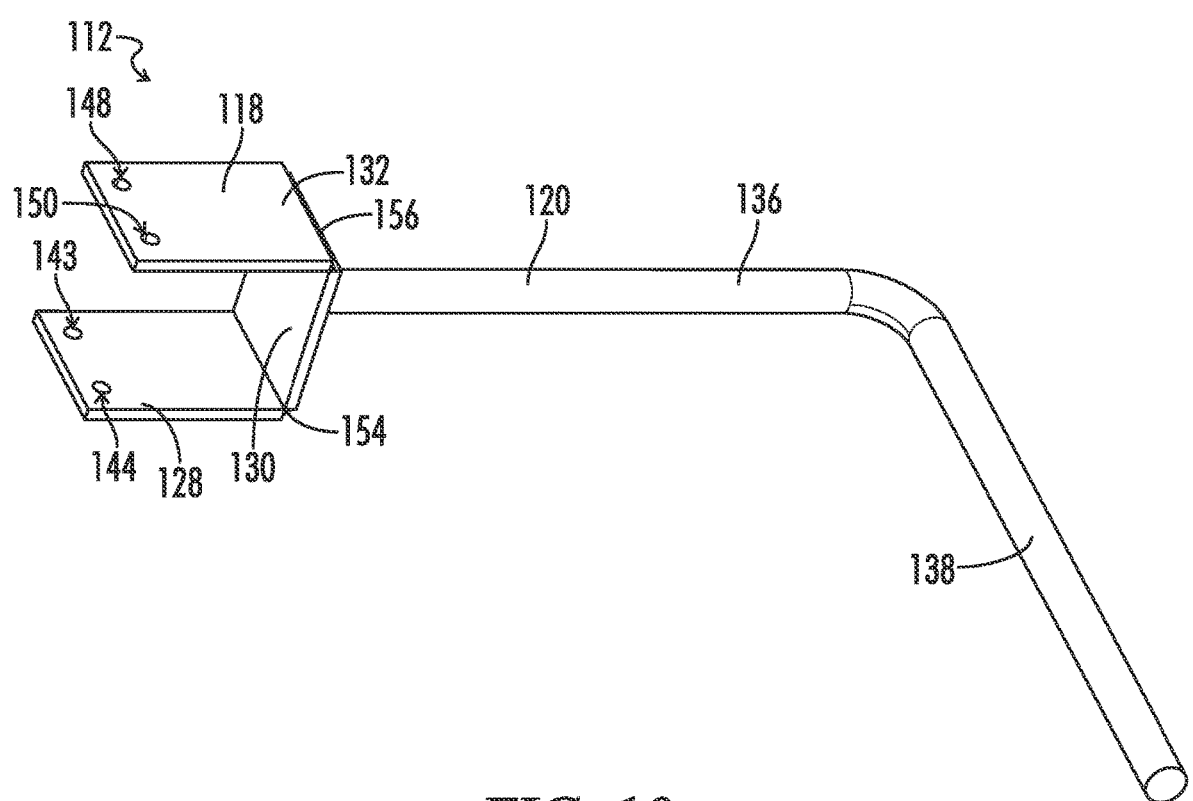
FIG. 10 is an isometric view of a top portion of the first example fender mounting assembly of FIGS. 1, 2 and 4-6.

With reference to FIG. 9 an example post assembly 250 includes a base plate 252, a post 254, a cap 256, a first cleat ring 258, and a second cleat ring 260. The base plate 252 defines a plurality of openings 262. The post 254 is connected to and extends from the base plate 252. The cap 256 is engaged with an end 264 of the post 254. The first cleat ring 258 and the second cleat ring 260 are connected to the base plate 252. The post 254 is between the first cleat ring 258 and the second cleat ring 260. In operation, fasteners (not shown) are inserted through the openings 262 to mount the example post assembly 250 to a horizontal surface of a dock (not shown).

Figure 2:
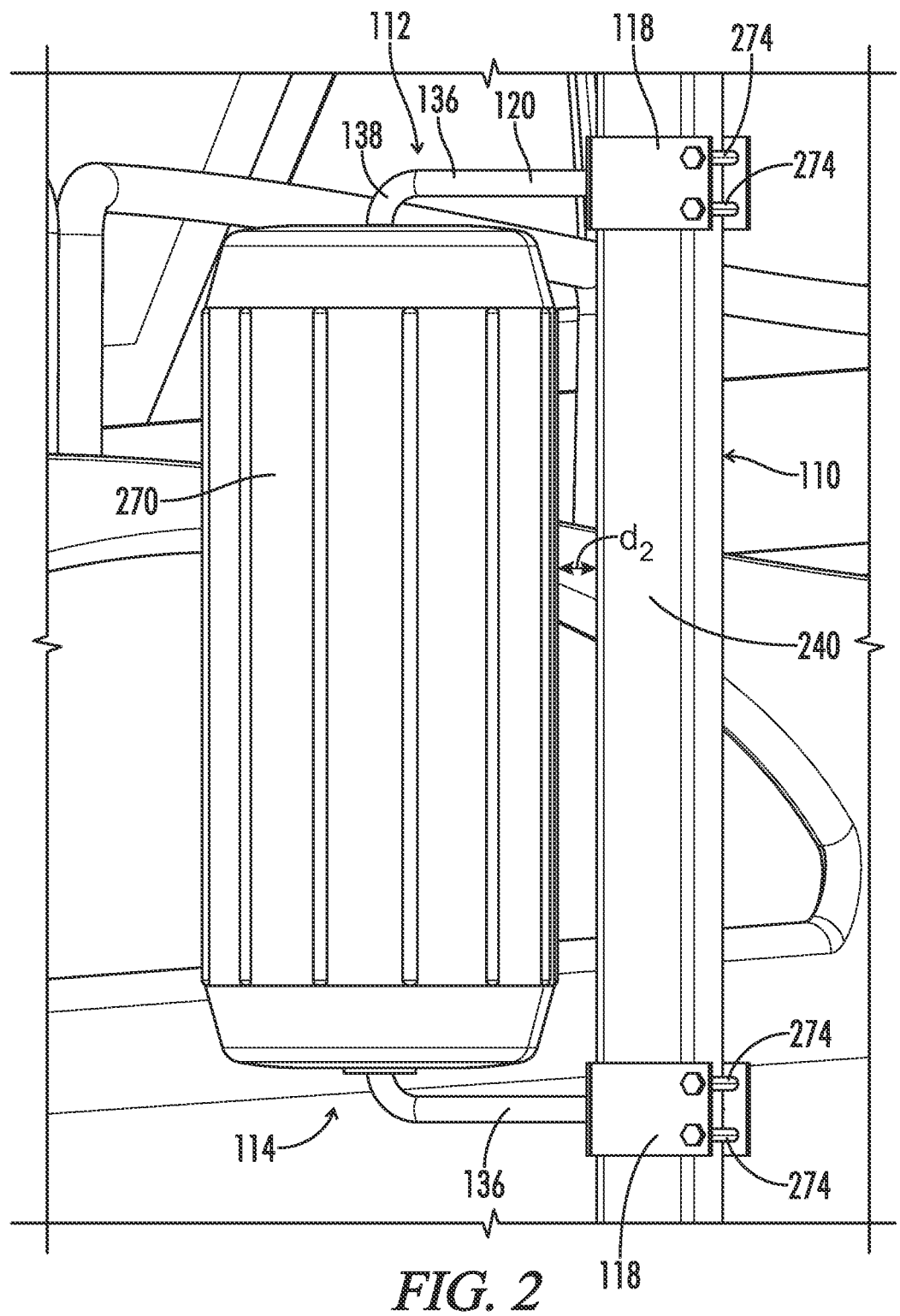
FIG. 2 is an enlarged perspective view of the first example fender mounting assembly engaged with the fender and with the first example post of FIG. 1.

With reference to FIG. 2, in operation, the top portion 112 and the bottom portion 114 are engaged with a fender 270. The fender 270 is elongated and defines a central bore 272. With reference to FIG. 5, in operation, the second section 138 of the top portion 112 is inserted through the fender 270. Thus, the fender 270 is rotatably engaged with the second section 138 of the top portion 112. Further, with reference to FIG. 6, in operation, the second section 138 of the bottom portion 114 is inserted through the fender 270 until the fender 270 contacts the retainer 124. Thus, the retainer 124 upwardly supports the fender 270 on the second section 138 of the branch 194 when the fender mounting assembly 216 is in an upright position. Further, the fender 270 is rotatably engaged with the second section 138 of the bottom portion 114. Additionally, in some embodiments, the fender 270 is slidably engaged with the retainer 124. In some embodiments, the retainer 124 comprises a bearing (not shown) configured to enable the fender 270 to rotate about the second section 138 of bottom portion 114 without sliding on the retainer 124. In other words, the retainer 124 permits the fender 270 to rotate about the second section 138 of the branch 194.

Further, the second section 138 of the top portion 112 and the second section 138 of the bottom portion 114 are thus aligned with one another. In some embodiments, when the top portion 112 and the bottom portion 114 are installed in the fender 270, a first end of the second section 138 of the top portion 112 and a second end of the second section 138 of the bottom portion 114 contact one another. In some embodiments, when the top portion 112 and the bottom portion 114 are installed in the fender 270, the first end of the second section 138 of the top portion 112 and the second end of the second section 138 of the bottom portion 114 define a gap having a predetermined distance (e.g., between 1 and 6 inches wide). In one embodiment, the predetermined distance is greater than a diameter of the fender 270 by between about ⅓ of the radius of the fender 270 in order to ensure the ability of the fender 270 to rotate about the portion of the branch extending through the fender 270 without the fender contacting other portions of the mounting bracket or the slip wall. In other words, when the top portion 112 and the bottom portion 114 are engaged with the fender 270, the second sections 138 are collinear. Additionally, in operation, the fender 270 is slidably engaged with the retainer 124.

With reference to FIG. 2, further in operation, the brackets 118 of the top portion 112 and the bottom portion 114 are mounted to the post 240. Continuing in operation, fasteners 274 (e.g., bolts, screws, rivets, cable ties, etc.) are inserted through the brackets 118. As the fasteners 274 are tightened, the brackets 118 are compressed to clamp onto the post 240. Thus, the top portion 112 and the bottom portion 114 are mounted to and retained along the post 240. Further, the fender 270 is captured by the top portion 112 and the bottom portion 114.

Figure 7:
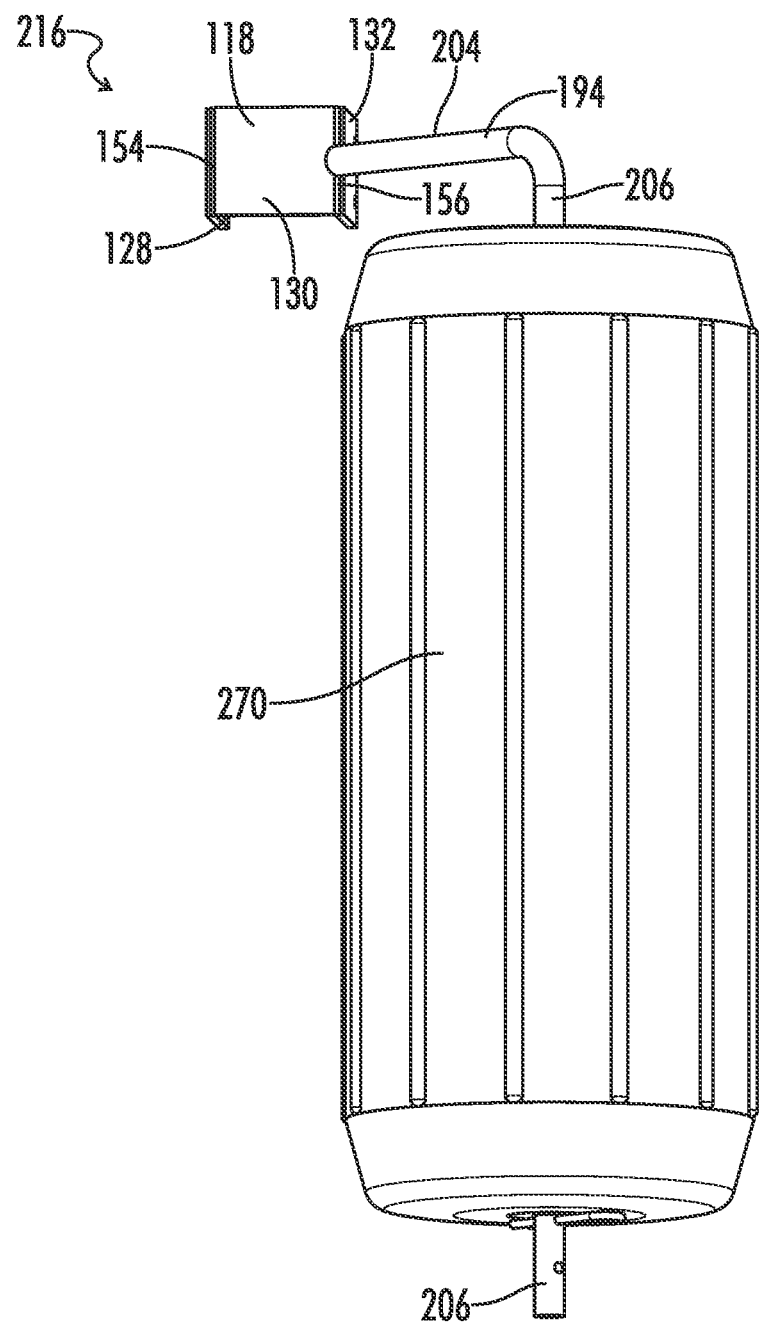
FIG. 7 is an isometric view of the second example fender mounting assembly of FIGS. 1, 3, and 4 engaged with the fender of FIGS. 1-6.
Figure 8:
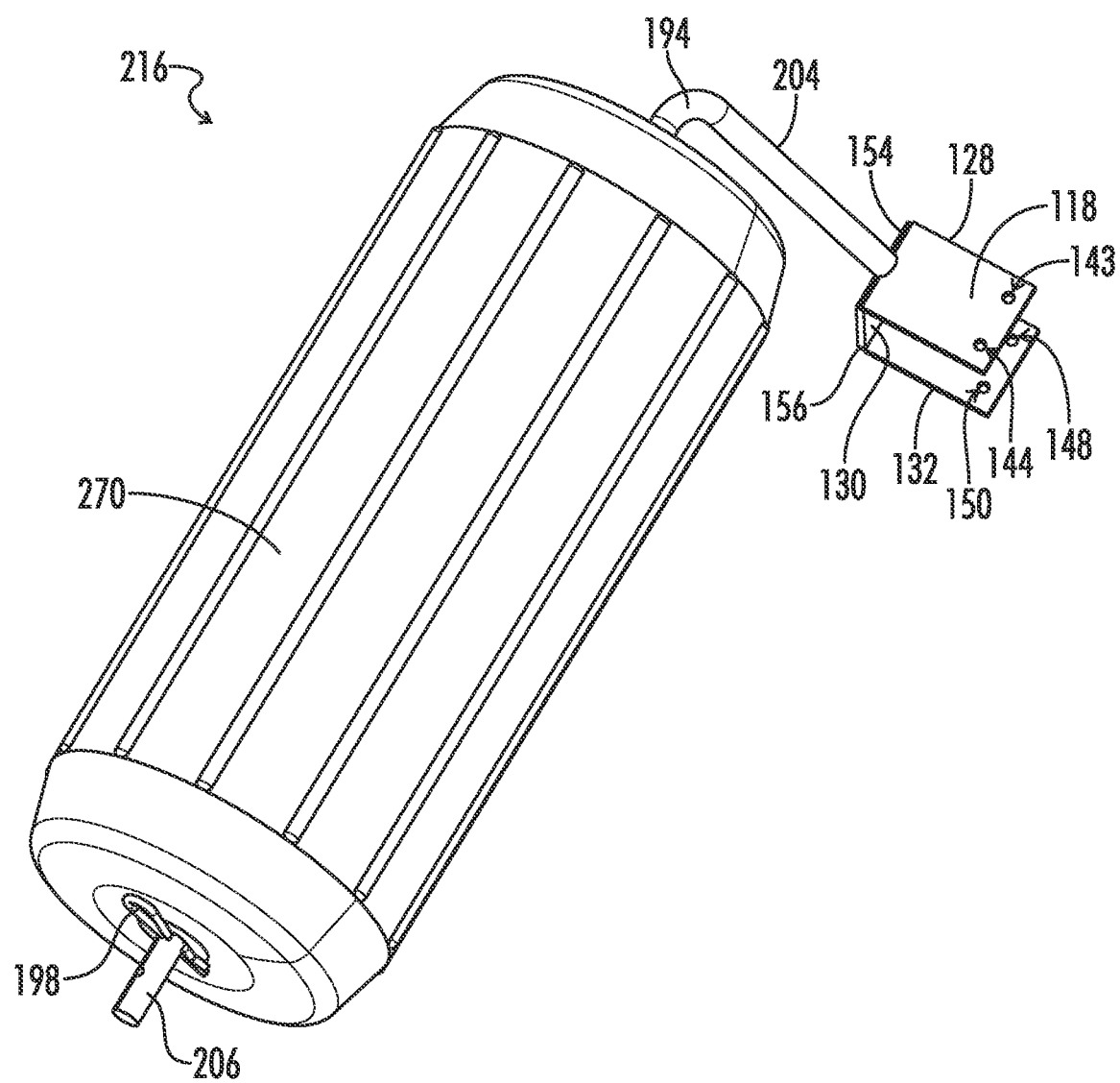
FIG. 8 is a second isometric view of the second example fender mounting assembly of FIGS. 1, 3, 4, and 7 engaged with the fender of FIGS. 1-7.

With reference to FIGS. 7 and 8, in operation, the second section 206 is inserted through the fender 270. Thus, the fender 270 is rotatably engaged with the second section 206. Looking at FIG. 8, additionally, in operation, the retainer 198 is inserted through the second section 206. Thus, the fender 270 is captured on the second section 206 between the retainer 198 and the first section 204. In one embodiment, the retainer 198 includes only a pin or snap ring, whereas in other embodiments, the retainer 124 supporting the fender 270 may be a washer or bearing and a pin 198 supporting the washer or bearing 124 and the fender 270, or the retainer 124 may be only a washer or bearing supporting the fender 270 when the first section of the branch is preventing the fender 270 from being able to slide off of the branch.

With reference to FIG. 3, further in operation, the bracket 118 is mounted to the post 240. Continuing in operation, the fasteners 274 are inserted through the bracket 118. As the fasteners 274 are tightened, the bracket 118 is compressed to clamp onto the post 240. It should be appreciated that the fender 270 extends beyond a bottom end 280 of the post 240.

Figure 4:
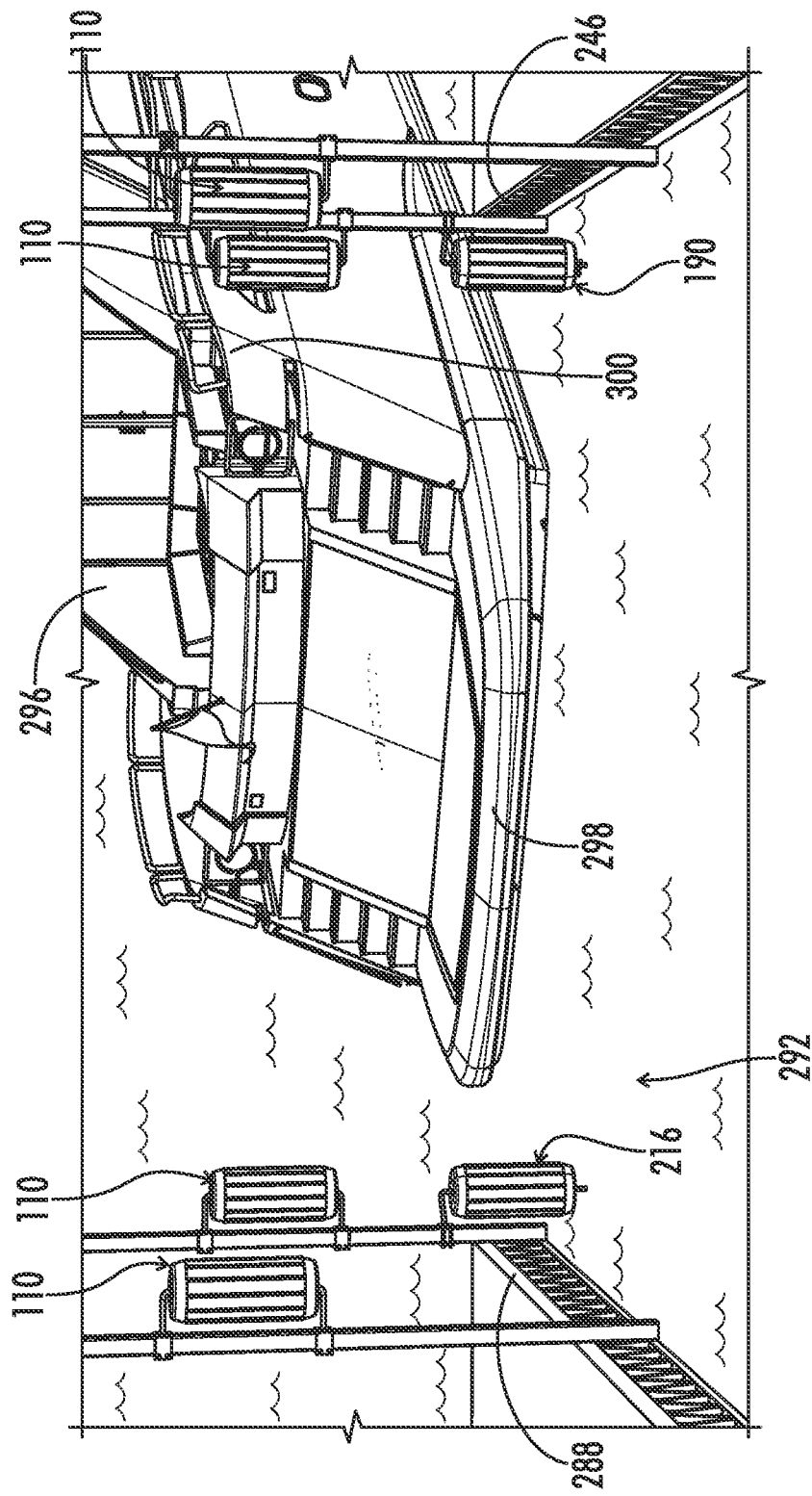
FIG. 4 is a perspective view of a plurality of first example fender mounting assemblies of FIGS. 1 and 2, the second example fender mounting assembly of FIGS. 1 and 3, and a third example fender mounting assembly engaged with a plurality of fenders and with a plurality of the first example posts of FIGS. 1-3 to distance the boat of FIG. 1 from the first dock of FIG. 1 and a second dock opposite the first dock.

With reference to FIG. 4, in operation, the first example fender mounting assembly 110, the second example fender mounting assembly 190, the third example fender mounting assembly 216, and the fourth example fender mounting assembly 220 (shown in FIGS. 30-32) work to hang fenders 270 outwardly from the first slip wall 246 and a second slip wall 288. The first slip wall 246 is opposite the second slip wall 288. In some embodiments, the first slip wall 246 and/or the second slip wall 288 comprise at least one of a pier, a pylon, a dock, or a sea wall. Thus, in some instances, the fenders 270 are hung in a slip 292 defined by the first slip wall 246 and the second slip wall 288. As a boat 296 enters and moves through the slip 292, the boat 296 may occasionally contact the fenders 270. The fenders 270 rotate freely about the branch portion extending through the fender 270 in order to allow the boat to continue entering the slip 292 without rubbing against any surface, including the fenders 270.

With reference to FIG. 4, more specifically, in some embodiments, the second example fender mounting assembly 190, the third example fender mounting assembly 216, and the fourth example fender mounting assembly 220 are mounted to the first slip wall 246 and to second slip wall 288 to position the fenders 270 at a mean water line in order to account for variance in tides. Thus, for the second fender mounting assembly 190, the third fender mounting assembly 216, and the fourth fender mounting assembly 220, the tops of the fenders 270 are above a maximum height of a swim platform of the boat 296 and the bottoms of the fenders 270 are below a minimum height of the swim platform. With reference to FIG. 3, first section 136 of the branch 194 is sized to hang the fender 270 at a predetermined distance $d_1$ (e.g., between 1 and 6 inches) away from the first post 240 and/or the first slip wall 246.

With reference to FIG. 3, it should be understood that the first section 136 of the branch 194 extends generally horizontally when the second fender mounting assembly 190 is attached to the first slip wall 246 in an upright position. In the same manner the branch 194 of the third fender mounting assembly 216 extends generally horizontally when the third fender mounting assembly 216 is attached to the second slip wall 288 in an upright position. Also in the same manner, the branch 194 of the fourth fender mounting assembly 220 extends generally horizontally when the fourth fender mounting assembly 220 is attached to the first slip wall 246 and/or the second slip wall 288 in an upright position. Additionally, with reference to FIG. 2, the second section 206 of the branch 194 extends downwardly from the first section 204 of the branch 194 when the second fender mounting assembly 190 is attached to the first slip wall 246 in an upright position.

With reference to FIG. 4, the first example fender mounting assemblies 110 are mounted to the first slip wall 246 and to second slip wall 288 to position the fenders 270 such that a top of the fender 270 is above a maximum height of a rub rail of the boat 296 and a bottom of the fender 270 is below a minimum height of the rub rail. With reference to FIG. 2, the first section 136 of the branch 120 is sized to hang the fender 270 at a predetermined distance $d_2$ (e.g., between 1 and 6 inches) away from the first post 240 and/or the first slip wall 246 (shown in FIG. 1).

With reference to FIG. 2, it should be understood that the first sections 136 of the branches 120 extend generally horizontally when the first fender mounting assembly 110 is attached to the first slip wall 246 and/or the second slip wall 288 in an upright position. With reference to FIG. 1, it should be appreciated that when the top portion 112 and the bottom portion 114 are properly mounted to the first slip wall 246 in an upright position and supporting the fender 270, a distance $d_3$ between the first section 136 of the top portion 112 and the first section 136 of the bottom portion 114 is greater than a length L of the fender 270.

With reference to FIG. 4, when the boat 296 contacts the fenders 270, the fenders 270 compress and the branches 120, 194 resiliently flex relative to the brackets 118. In some embodiments, portions of the branches resiliently flex at a higher spring rate relative to the fender 270 in order to provide additional cushioning of the boat relative to the slip wall 246, 288. Thus, the boat 296 is prevented from contacting the first slip wall 246 and/or the second slip wall 288.

In other words, the fenders 270, the first example fender mounting assembly 110, the second example fender mounting assembly 190, the third example fender mounting assembly 216, and the fourth example fender mounting assembly 220 work together as a boat docking system to provide a rolling padding surface to the boat 296 along the slip 292.

Figure 33:
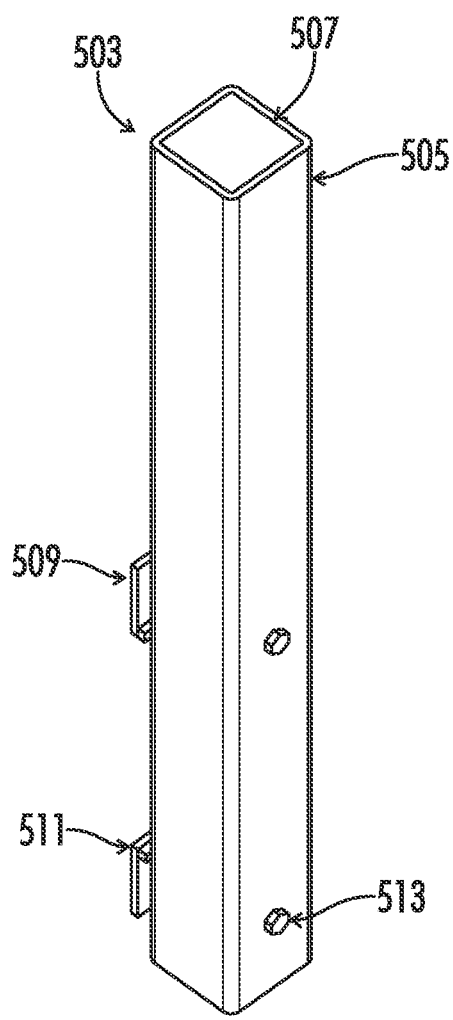
FIG. 33 is an isometric view of a post mount of the docking system of FIG. 1.

Referring to FIG. 33, in one embodiment, the boat docking system further includes a post mount 503. The post mount 503 includes a tubular body 505, an endcap 507, and fastener pairs 509. In one embodiment, each fastener pair 509 includes a bolt 513 and a wedge nut 511. The bolt 513 is configured to pass through a transverse hole through the tubular body and thread into the wedge nut 511. The nuts 511 may either be located 'behind' a section of dock frame (relative to the tubular body 505 being 'in front' of the section of dock) to clamp a section of a floating dock between the tubular body 505 and the wedge nut 511 when the bolts 513 are tightened. Alternatively, holes may be drilled in the dock and the bolts 513 passed through those holes as well as the transverse holes in the tubular body 505 to secure the post mount 503 to the dock. However, most commercial floating docks do not allow a customer to drill through the dock frame, so the clamping method of securing the post mount 503 to a metal frame of a floating dock may be preferred in certain circumstances. In one embodiment, the wedge nuts 511 are oversized rectangular nuts such that they can exert a clamping force without slipping off of a metal floating dock frame. The post mount 503 is thus secured to the dock with a significant section of the tubular body 505 extending above a walking surface of the dock (or below the dock frame to where the dock floats are) such that the bracket 118 may be secured to the post mount 503. Thus, the post mount 503 is an accessory for mounting fender mounting assemblies to a slip wall (e.g., floating dock steel frame).

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention of a new and useful FENDER MOUNTING ASSEMBLIES, it is not intended that such references be construed as limitations upon the scope of this invention except as set forth in the following claims.

What is claimed is:

1. A fender mounting assembly configured to mount a fender to a slip wall, said fender mounting assembly comprising:
   the fender, wherein the fender is elongated with a central bore and the fender is filled with air to absorb impact forces;
   a backing plate configured to attach to a slip wall to mount the fender mounting assembly to the slip wall; and
   a branch configured to hold the fender a predetermined distance away from the slip wall, the branch extending from the backing plate and comprising:
      a first section having a first end and a second end, the first end being attached to the backing plate;
      a second section, the second section having a third end and a fourth end, the third end being attached to the second end of the first section, wherein, when the fender mounting assembly is attached to the slip wall in an upright position via the backing plate, the second section of the branch extends downwardly from the first section of the branch; wherein:
   the second section of the branch extends into the central bore of the fender when the fender mounting assembly is attached to the slip wall in the upright position via the backing plate such that the fender may rotate about the second section of the branch; and
   the branch has a higher spring rate than the fender; and
   a retainer configured to secure the fender on the second section of the branch and permit the fender to rotate about the second section of the branch, said retainer comprising:
      a washer configured to rotate about the second section of the branch; and
      a pin removably inserted through an opening in the second section of the branch below the washer such that the pin supports the washer, wherein:
         the retainer is engaged with the second section of the branch at the fourth end of the second section of the branch;
         the retainer is configured to upwardly support the fender on the second section of the branch when the fender mounting assembly is attached to the slip wall in an upright position via the backing plate; and
         the fender is supported by the retainer, wherein:
   the first section of the branch extends generally horizontally when the fender mounting assembly is attached to the slip wall in an upright position and from the backing plate at angle between 15 and 85 degrees with respect to the backing plate.

2. The fender mounting assembly of claim 1, wherein:
   the backing plate has a first edge and a second edge opposite the first edge;
   the backing plate further comprises a first clamping ear connected to the backing plate at the first edge;
   the backing plate further comprises a second clamping ear connected to the backing plate at the second edge; and the first clamping ear and the second clamping ear are configured to clamp onto a post of the slip wall to attach the backing plate to the slip wall.

3. The fender mounting assembly of claim 1, wherein the slip wall comprises at least one of a pier, a pylon, a dock, or a sea wall.

4. The fender mounting assembly of claim 1, wherein the second section of the branch is longer than the first section of the branch.

5. A fender mounting assembly configured to mount a fender to a slip wall, said fender mounting assembly comprising:
the fender, wherein the fender is elongated with a central bore and the fender is filled with air to absorb impact forces;
a top portion comprising:
a backing plate configured to attach to the slip wall to mount the fender mounting assembly to the slip wall; and
a branch configured to hold the fender a predetermined distance away from the slip wall, the branch extending from the backing plate of the top portion and comprising:
a first section having a first end and a second end, the first end being attached to the backing plate; and
a second section, the second section having a third end and a fourth end, the third end being attached to the second end of the first section, wherein, when the fender mounting assembly is attached to the slip wall in an upright position via the backing plate, the second section of the branch extends downwardly from the first section of the branch into the central bore of the fender such that the fender is rotatable about the second section of the top portion,
wherein the branch has a higher spring rate than the fender; and
a bottom portion comprising:
a backing plate configured to attach to the slip wall to mount the fender mounting assembly to the slip wall; and
a branch configured to hold the fender the predetermined distance away from the slip wall, the branch extending from the backing plate of the bottom portion and comprising:
a first section having a first end and a second end, the first end being attached to the backing plate; and
a second section, the second section having a third end and a fourth end, the third end being attached to the second end of the first section, wherein, when the fender mounting assembly is attached to the slip wall in the upright position via the backing plate of the bottom portion, the second section of the branch extends upwardly from the first section of the branch into the central bore of the fender such that the fender is rotatable about the second section of the bottom portion,
wherein the branch has a higher spring rate than the fender, wherein:
the second section of the branch of the top portion has a lower end,
the second section of the branch of the bottom portion has an upper end, and
when the top portion and the bottom portion of the fender mounting assembly are properly mounted to the slip wall in an upright position, the lower end of the second section of the branch of the top portion contacts the upper end of the second section of the branch of the bottom portion in the central bore of the fender.

6. The fender mounting assembly of claim 5, wherein the bottom portion comprises a retainer configured to upwardly support the fender when the fender mounting assembly is attached to the slip wall in an upright position and the second section of the branch of the bottom portion is received in the central bore of the fender.

7. The fender mounting assembly of claim 6, wherein:
the retainer has a relatively smooth top surface configured to permit a bottom end of the fender to slidably rotate on the top surface of the retainer; or
the retainer comprises a bearing configured to enable the fender to rotate about the second section of the branch of the bottom portion without sliding on the top surface of the retainer.

8. The fender mounting assembly of claim 5, wherein, when the top portion and the bottom portion are properly mounted to the slip wall in an upright position and supporting the fender, a distance between the first section of the branch of the top portion and the first section of the branch of the bottom portion is greater than a length of the fender.

9. A boat docking system configured to mount to opposing slip walls of a slip for a boat, the system comprising:
opposing first and second fender mounting assemblies, each of the first and second fender mounting assemblies comprising:
a first fender, wherein the first fender is elongated with a central bore and the first fender is filled with air to absorb impact forces;
a backing plate configured to attach to one of the slip walls; and
a branch configured to hold the first fender a predetermined distance away from the slip wall, the branch extending from the backing plate and comprising:
a first section having a first end and a second end, the first end being attached to the backing plate; and
a second section, the second section having a third end and a fourth end, the third end being attached to the second end, wherein, when each of the first and second fender mounting assemblies are attached to one of the slip walls in an upright position via the backing plate, the second section extends downwardly from the first section into the central bore of the first fender such that the first fender is rotatable about the second section, wherein the branch has a higher spring rate than the first fender; and
a retainer configured to secure the first fender on the second section of the branch and permit the first fender to rotate about the second section of the branch, said retainer comprising:
a washer configured to rotate about the second section of the branch; and
a pin removably inserted through an opening in the second section of the branch below the washer such that the pin supports the washer, wherein:
the retainer is engaged with the second section of the branch at the fourth end of the second section of the branch;
the retainer is configured to upwardly support the first fender on the second section of the branch when the first fender mounting assembly is attached to the slip wall in an upright position via the backing plate; and
the first fender is supported by the retainer; and opposing third and fourth fender mounting assemblies, each of the third and fourth fender mounting assemblies comprising:
  a second fender, wherein the second fender is elongated with a central bore and the second fender is filled with air to absorb impact forces;
  a top portion comprising:
    a first bracket configured to mount to one of the slip walls;
    a first top section connected to the first bracket and configured to extend away from the slip wall; and
    a second top section extending perpendicularly from the first top section and configured to be inserted downwardly into the central bore of the second fender such that the second fender is rotatable about the second top section, wherein the first top section and the second top section have a higher spring rate than the second fender; and
  a bottom portion comprising:
    a second bracket configured to mount to the slip wall;
    a first bottom section connected to the second bracket and configured to extend away from the slip wall; and
    a second bottom section extending perpendicularly from the first bottom section and configured to be inserted upwardly into the central bore of the second fender such that the second fender is rotatable about the second bottom section, wherein the first bottom section and the second bottom section have a higher spring rate than the second fender, wherein:
  the second section of the branch of the top portion has a lower end,
  the second section of the branch of the bottom portion has an upper end, and
  when the top portion and the bottom portion of the second fender mounting assembly are properly mounted to the slip wall in an upright position, the lower end of the second section of the branch of the top portion contacts the upper end of the second section of the branch of the bottom portion in the central bore of the second fender.

10. The system of claim 9, wherein the opposing third and fourth fender mounting assemblies are mounted at a height corresponding to a rub rail of the boat.

11. A fender mounting assembly configured to mount a fender to a slip wall, said fender mounting assembly comprising:
  the fender, wherein the fender is elongated with a central bore and the fender is filled with air to absorb impact forces;
  a backing plate configured to attach to a slip wall to mount the fender mounting assembly to the slip wall; and
  a branch configured to hold the fender a predetermined distance away from the slip wall, the branch extending from the backing plate and comprising:
    a first section having a first end and a second end, the first end being attached to the backing plate;
    a second section, the second section having a third end and a fourth end, the third end being attached to the second end of the first section, wherein, when the fender mounting assembly is attached to the slip wall in an upright position via the backing plate, the second section of the branch extends downwardly from the first section of the branch; wherein:
  the second section of the branch extends into the central bore of the fender when the fender mounting assembly is attached to the slip wall in the upright position via the backing plate such that the fender may rotate about the second section of the branch; and
  the branch has a higher spring rate than the fender; and
  a retainer configured to secure the fender on the second section of the branch and permit the fender to rotate about the second section of the branch, said retainer comprising:
    a washer configured to rotate about the second section of the branch; and
    a pin removably inserted through an opening in the second section of the branch below the washer such that the pin supports the washer, wherein:
      the retainer is engaged with the second section of the branch at the fourth end of the second section of the branch;
      the retainer is configured to upwardly support the fender on the second section of the branch when the fender mounting assembly is attached to the slip wall in an upright position via the backing plate; and
      the fender is supported by the retainer, wherein:
  the backing plate has a first edge and a second edge opposite the first edge;
  the backing plate further comprises a first clamping ear connected to the backing plate at the first edge;
  the backing plate further comprises a second clamping ear connected to the backing plate at the second edge; and
  the first clamping ear and the second clamping ear are configured to clamp onto a post of the slip wall to attach the backing plate to the slip wall.

* * * * *